United States Patent [19]
Dieterle et al.

[11] Patent Number: 6,040,664
[45] Date of Patent: Mar. 21, 2000

[54] CIRCUIT FOR LIMITING THE BEAM CURRENT OF A CATHODE RAY TUBE

[75] Inventors: Franz Dieterle, Schiltach; Martin Läufer, Villingen-Schwenningen, both of Germany

[73] Assignee: Deutsche-Thompson Brandt GmbH, Germany

[21] Appl. No.: 08/999,879

[22] Filed: Feb. 25, 1998

Related U.S. Application Data

[63] Continuation of application No. 08/829,545, Mar. 28, 1997, abandoned.

[30] Foreign Application Priority Data

Apr. 24, 1996 [DE] Germany ............................ 196 16 272

[51] Int. Cl.[7] .................................................. H01J 29/52
[52] U.S. Cl. ......................... 315/383; 315/401; 348/380
[58] Field of Search ..................................... 315/383, 389, 315/401, 411; 348/380, 687

[56] References Cited

U.S. PATENT DOCUMENTS

| | | | |
|---|---|---|---|
| 4,001,503 | 1/1977 | Nomoto et al. | 348/380 |
| 4,042,858 | 8/1977 | Collete et al. | 315/379 |
| 4,126,816 | 11/1978 | Willis | 315/411 |
| 4,645,988 | 2/1987 | Gawell et al. | 315/401 |
| 4,945,414 | 7/1990 | Gurley et al. | 348/687 |

*Primary Examiner*—Edward P. Westin
*Assistant Examiner*—Nikita Wells
*Attorney, Agent, or Firm*—Joseph S. Tripoli; Peter M. Emanuel; Frederick A. Wein

[57] ABSTRACT

In a television receiver, a higher beam current is enabled and a brighter image is provided, without adversely effecting the life of the cathode ray tube or endangering the high-tension transformer. The high-tension transformer includes a temperature sensor which acts with a control circuit for reducing the beam current when the temperature of the transformer rises above a specific temperature.

8 Claims, 2 Drawing Sheets

CIRCUIT FOR LIMITING THE BEAM CURRENT OF A CATHODE RAY TUBE

This Application is a continuation of the parent application Ser. No. 08/829,545 filed on Mar. 28, 1997, now abandoned.

BACKGROUND

The invention is based on a circuit for limiting the beam current of a cathode ray tube in a television receiver.

In a television receiver, it is known and necessary to limit the beam current flowing in the cathode ray tube, in order to protect the cathode ray tube and the high-tension transformer. If the beam current is excessively high over a relatively long time period, the guaranteed life of the cathode ray tube is at risk, while, in the high-tension transformer, the high-tension rectifier diodes, which are potted together with the windings, can, in particular, be destroyed by an excessively high temperature.

In circuits for limiting the beam current, only one limiter function is in general active. In order to display briefly occurring white image points with adequate brightness, the limit value is set such that it is above the beam current at which the cathode ray tube may be loaded continuously, without having to accept damage. In normal operation with moving images, the long-term average is always below this maximum limit of the beam current, since there are also dark scenes in between, in which the limiting does not act. However, continuous operation with active beam current limiting is theoretically possible.

The, dimensioning of the beam current limiting circuit has to take account of an extreme load case. This occurs, for example, if the television receiver is operated at an ambient temperature of +40° C. over a number of hours with a completely white image in extremely poor cooling conditions, for example in a bookcase. Even in this extreme load case, the limit values for the high-tension transformer must not be exceeded. The extreme load case admittedly occurs very rarely, or even never, with a unit in practice. The necessity to take account of this in the dimensioning of the beam current limiting constrains the freedom, however, for the maximum permissible beam current for normal moving images. In other words: if it were possible to be certain that the said extreme load case would not occur, a higher beam current could be permitted for normal moving images, and a brighter image could thus be achieved.

SUMMARY OF THE INVENTION

The invention is based on the object of making possible a higher beam current for white image points, and thus a brighter image, without this resulting in the high-tension transformer being endangered in the extreme load case.

The invention thus comprises the transformer containing a temperature sensor which acts on the control circuit for the beam current when above a specific temperature for the purpose of reducing the beam current.

The invention is based on the following knowledge and considerations. The extreme load case cannot be precluded in practice and must be taken into account for the dimensioning of the beam current limiting circuit. However, danger to or destruction of the transformer is possible only as a result of an increased transformer temperature. Thus, according to the invention, the temperature of the high-tension transformer is monitored. If the temperature of the transformer, and thus that of the rectifier diodes as well, exceeds a specific value, the beam current is reduced in the manner of a control loop, such that a maximum temperature of, for example, 100° C. occurs on the transformer even during the extreme load case.

The solution according to the invention has a number of advantages. Since an existing danger to the high-tension transformer in an extreme load case is identified and is dealt with by the temperature monitoring, a higher beam current may be permitted for normal operation with moving images, and a brighter image may thus be achieved, without there being any danger to the transformer. The high-tension transformer remains protected by the temperature monitoring in all cases. In particular, the rectifier diodes cannot reach an unacceptably high temperature, and the core of the transformer does not saturate. If necessary, the high-tension transformer may be constructed to be smaller and cheaper. The measure according to the invention requires only a small number of components, for example a temperature-dependent resistor, a non-reactive resistor and a diode. The unit itself is virtually indestructible, even if, in the extreme case, it is operated at an ambient temperature of +40° C., in poor cooling conditions, for a large number of hours with a completely white image. The brightness is reduced in the extreme load case. However, in practice, this is not a disadvantage since no normal image is present in the said extreme load case anyway, the change in brightness takes place so slowly that it cannot be noticed, provided the dimensioning is suitable, and this case as a rule occurs only rarely, or never, for a specific unit.

The circuit which is controlled by the temperature sensor is preferably dimensioned such that, in the case of a long-term beam current behaviour, it does not respond to moving images having a normal average brightness. The temperature sensor is preferably formed by a temperature-dependent resistor, a so-called NTC or PTC thermistor. Such resistors are commercially available and are cheap. The temperature sensor, in the form of a temperature-dependent resistor, is preferably potted in a plastic body together with the coil former, the windings and the rectifier diodes. The ends of the resistor are in this case connected to two connecting terminals of the transformer. It has been found that, with this solution, the temperature of the resistor follows the temperature of the rectifier diodes with sufficient accuracy and with an adequate time constant. The temperature on the temperature-dependent resistor is thus a real measure of the temperature of the rectifier diodes.

In another embodiment of the invention, the temperature-dependent resistor is in close contact with the core of the transformer. This also results in the temperature of the resistor following the temperature of the rectifier diodes sufficiently accurately and quickly. This arrangement has the advantage that the voltage of the core is at earth potential, that is to say is not in the high-tension region, and there are therefore no insulation problems with the temperature-dependent resistor.

The resistor can also be located between the core and a printed circuit board which is fitted with the transformer. In this case, the arrangement is designed such that the heat from the core is transmitted as well as possible to the resistor, but as little as possible to the printed circuit board and the conductor tracks applied to it.

The temperature-dependent resistor may also be located in a cutout such as a notch on the surface of the core. In consequence, the thermal contact between the core and the resistor can be further improved, in that the core is in direct contact with the resistor over about 180° of its circumference. The temperature-dependent resistor can also be embedded in a plastic body which is enclosed between the core and the printed circuit board.

The temperature sensor preferably forms part of a network which is connected via a threshold value circuit to a control terminal, which influences the beam current, of a cathode ray tube drive circuit. In one embodiment, the series circuit formed by the temperature-dependent resistor and a further non-reactive resistor is connected between an operating voltage and earth, and the centre point of the series circuit is connected via a diode to the control terminal which influences the beam current.

BRIEF DESCRIPTION OF THE DRAWINGS

The invention is explained in the following text with reference to the drawing, in which.

DETAILED DESCRIPTION OF THE PREFERRED EMBODIMENTS

Figure 1:
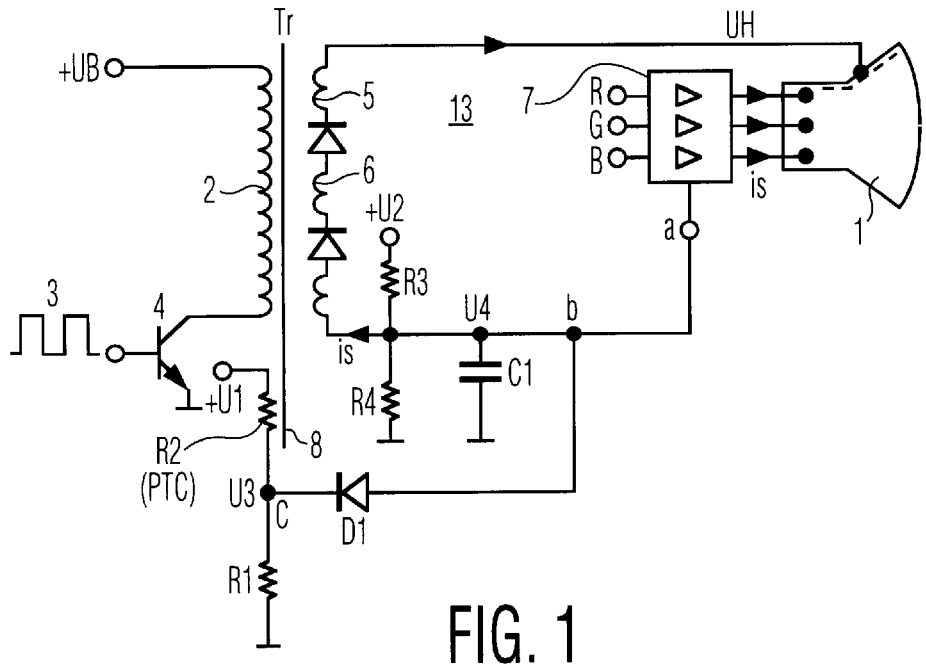
FIG. 1 shows an example of the circuit according to the invention.

FIG. 1 shows the high-tension transformer Tr which supplies the high tension UH for the cathode ray tube 1 of a television receiver. The primary winding 2 of the transformer Tr is connected to the operating voltage +UB and, via a switching transistor 4 which is operated periodically by the switching voltage 3, to earth. The high-tension winding 5 is designed as a diode split winding having a plurality of high-tension rectifier diodes 6. The control signals R, G, B are supplied to the cathode ray tube 1 via the video output amplifier 7, and control the beam currents 'is' in the cathode ray tube 1.

In addition, a circuit having the resistors R3 and R4 as well as the capacitor C1 is provided, in order to limit the beam current 'is'. The resistors R3 and R4 form a voltage divider with the filter capacitor Cl. The resistor R3 is connected to the operating voltage +U2 and acts as a current source. When the beam current flowing via the resistor R4 is zero, a current flows only from +U2 via the resistor R3 into the resistor R4 and produces a voltage U4 at the point B. The high-tension winding 5 takes over part of the current through the resistor R3 and thus reduces the voltage across the resistor R3 to lower values, or even negative values. The voltage U4 is applied to the control terminal a of the video amplifier 7 as a control variable for the beam current limiting. The circuit described so far is known.

The series circuit formed by the PTC thermistor R2 and the resistor R1 is now provided in addition between the operating voltage +U1 and earth, as well as the diode D1. The resistor R2 is in close contact with the ferrite core 8 of the transformer Tr. The voltage divider formed by the resistors R1, R2 thus supplies a voltage which is dependent on the respective temperature of the ferrite core 8. In normal conditions, that is to say when a normal moving television image is present, the voltage U3 is greater than the voltage U4, so that the point c is decoupled from the point b by the reverse-biased diode D1. If the temperature of the transformer Tr, and thus the temperature of the ferrite core 8 and of the resistor R2 as well, rises, the resistance of R2 becomes less, so that the voltage U3 falls. If a specific temperature is exceeded, the voltage U3 finally becomes less than the voltage U4 and the diode D1 thus becomes forward-biased. Some of the current coming from the resistor R3 now flows via the forward-biased diode D1 and no longer through the high-tension winding 5. This means that the threshold value of the beam current limiter is gradually reduced, and the transmitted power is thus reduced in a desired manner. This is a closed loop, the losses in the ferrite core 8 together with the transmitted power being reduced, and the temperature being reduced to and stabilized at an absolute value which is no longer dangerous for the transformer. The voltage divider which is formed from the resistors R1 and R2 defines the point at which the beam current limiting, which is controlled by the temperature of the transformer Tr, becomes active.

Figure 2:
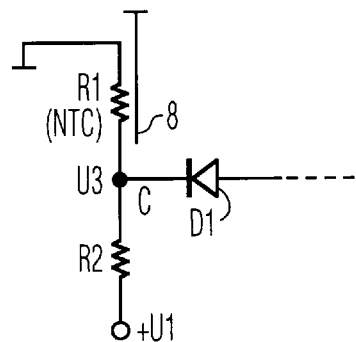
FIG. 2 shows a modification of the circuit according to FIG. 1.

FIG. 2 shows a modification of the circuit according to FIG. 1. Instead of the PTC thermistor R2, the resistor R1 is configured as an NTC thermistor and is arranged on the ferrite core 8. The method of operation is virtually the same as in FIG. 1. When the temperature of the ferrite core 8 rises, the resistance of the resistor R1 rises, so that, as in FIG. 1, the voltage U3 at point c falls and, finally, above a specific temperature, the diode D1 becomes forward-biased and initiates the beam current limiting.

Figure 3:
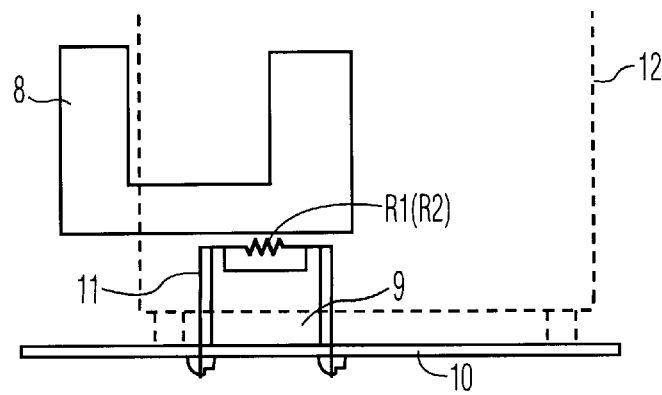
FIG. 3 shows a design solution for fitting the temperature sensor to the high-tension transformer.

FIG. 3 shows the arrangement of the resistor R1 according to FIG. 2 or R1 according to FIG. 2 on the ferrite core 8. The resistor R1 or R2 is embedded in a plastic body 9 which is located between the lower edge of the ferrite core 8 and the printed circuit board 10, and is held by the bracket 11. The housing of the high-tension transformer Tr is indicated symbolically by the plastic body 12.

Figure 4:
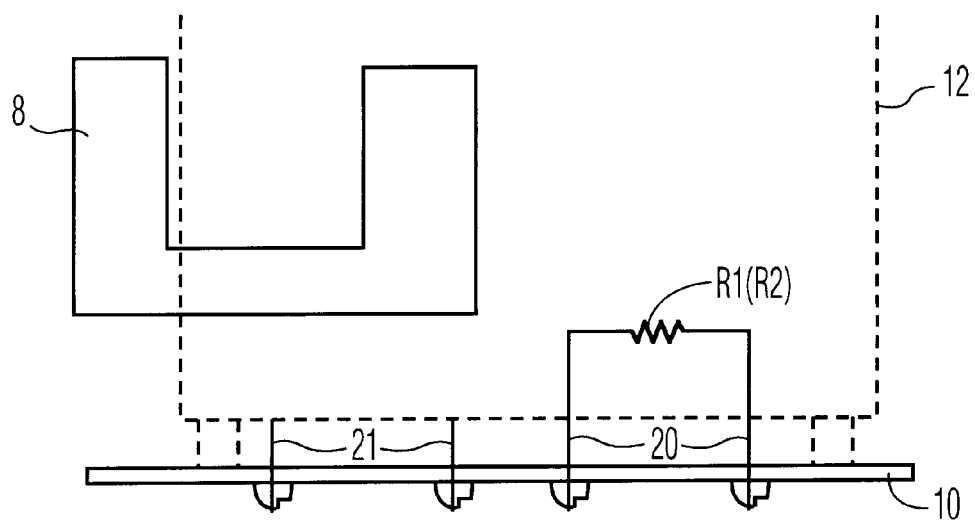
FIG. 4 shows another arrangement of the temperature sensor on the transformer.

In FIG. 4, the temperature-dependent resistor R1 or R2 is also potted in the plastic body 12 in which the coil former, the primary winding 2 arranged on it, the secondary winding 6 and, if appropriate, additional windings as well as the high-temperature rectifier diodes are also potted. The ends of the resistor R1 or R2 are connected to two additional connecting pins 20 which engage in corresponding conductor tracks on the printed circuit board 10 and produce the circuit of the resistor R1 or R2 according to FIG. 1 or 2. The plastic body 12, which represents the actual housing of the transformer, also contains a multiplicity of connecting pins 21 for the primary winding, the high-tension winding, and, if appropriate, further additional windings. The connecting pins 21 are likewise connected to corresponding conductor tracks on the underneath of the printed circuit board 10. This arrangement of the resistor R1 or R2 in the potting compound of the plastic body 12 likewise ensures, without any direct contact with the core 8, that the resistor R1 or R2 follows the temperature of the high-tension rectifier diodes, which are potted in the plastic body 12, with sufficient accuracy and with adequate time constant.

Figure 5:
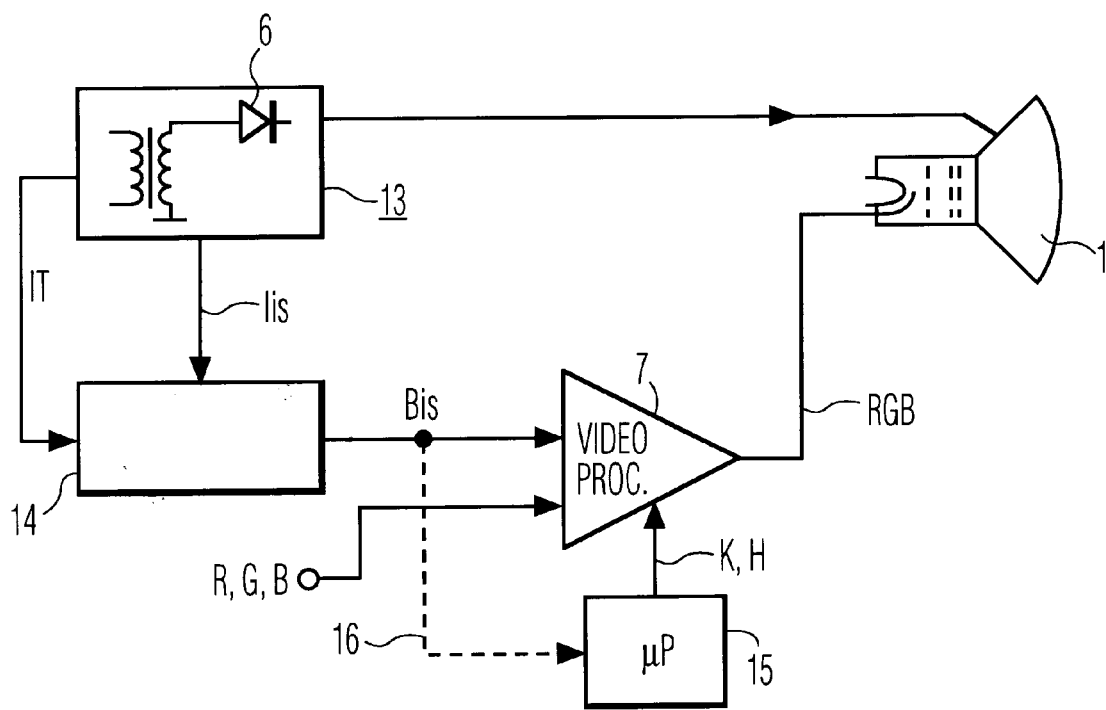
FIG. 5 shows a block diagram which contains the circuit according to the invention.

FIG. 5 shows a simplified block diagram of the cathode ray tube control circuit of the television receiver, which contains the solution according to the invention as shown in FIGS. 1 to 4. The high-tension stage 13 which, inter alia, contains the transformer Tr supplies the high tension UH for the cathode ray tube 1, the information IT about the temperature of the ferrite core 8 and the information I is about the respective value of the beam current 'is' to the interface circuit 14. The circuit 14 supplies the control variable Bis for the beam current limiting to the video processor 7, which supplies the control signals R, G, B to the cathode ray tube 1. The signals R, G, B are supplied to the video processor 7 from a known signal processing circuit. The microprocessor 15 supplies control signals for the contrast K and the brightness H to the processor 7. The line 16, which is illustrated by a dotted line, can optionally be used in addition since the control loop can be closed via the microprocessor 15. This is also able to control the beam current by adjusting the contrast and brightness, as is done in general within the video processor 7.

We claim:

1. An arrangement for providing high-tension for a cathode ray tube of a television receiver comprising:
   a high tension transformer including a primary winding fed by an alternating current and a high-tension winding for providing the high-tension via rectifier means, both windings being arranged on a coil former located on a core of said transformer,
   said cathode ray tube being coupled to a network for providing a control voltage for limiting the beam current of said cathode ray tube,
   a temperature sensor being arranged in physical contact with the high tension transformer so that heat conduction between the body of said high tension transformer and the temperature sensor is provided, the temperature sensor being coupled to the network so that if the temperature of said high-tension transformer exceeds a predetermined value endangering said transformer, the beam current is reduced by said control voltage.

2. The arrangement according to claim 1, wherein said temperature sensor is a temperature dependent resistor.

3. The arrangement according to claim 1, wherein said temperature sensor is potted in a plastic body together with said coil former, said windings and said rectifier means.

4. The arrangement according to claim 1, wherein said temperature sensor is arranged in close contact with said core of the transformer.

5. The arrangement according to claim 4, wherein said temperature sensor is disposed in a cutout on a surface of said core.

6. The arrangement according to claim 1, wherein said temperature sensor is embedded within the body of said high tension transformer.

7. The arrangement according to claim 1, wherein said temperature sensor is embedded within a plastic body enclosed between said core and a printed circuit board supporting said high tension transformer.

8. The arrangement according to claim 2, wherein said temperature-dependent resistor and a further resistor are connected in series with each other, and the series combination is connected between an operating voltage and ground, and a center point of said series combination being connected via a diode to the network.

* * * * *